(12) United States Patent
Choi

(10) Patent No.: US 7,428,025 B2
(45) Date of Patent: Sep. 23, 2008

(54) CONDUCTIVE POLARIZER FOR LCD

(75) Inventor: Dae Jung Choi, Seoul (KR)

(73) Assignee: Boe Hydis Technology Co., Ltd. (KR)

( * ) Notice: Subject to any disclaimer, the term of this patent is extended or adjusted under 35 U.S.C. 154(b) by 300 days.

(21) Appl. No.: 11/086,703

(22) Filed: Mar. 22, 2005

(65) Prior Publication Data

US 2005/0253977 A1 Nov. 17, 2005

(30) Foreign Application Priority Data

May 14, 2004 (KR) ............... 10-2004-0034147

(51) Int. Cl.
*G02F 1/1333* (2006.01)
(52) U.S. Cl. ............... 349/40; 349/96; 349/137
(58) Field of Classification Search ............... 349/96, 349/137, 40
See application file for complete search history.

(56) References Cited

U.S. PATENT DOCUMENTS

| | | | | |
|---|---|---|---|---|
| 5,750,054 A | * | 5/1998 | Cinquina et al. | ............ 252/500 |
| 6,809,783 B2 | * | 10/2004 | Noh et al. | ............ 349/96 |
| 2004/0197550 A1 | * | 10/2004 | Ke et al. | ............ 428/327 |
| 2005/0227053 A1 | * | 10/2005 | Kim et al. | ............ 428/212 |

\* cited by examiner

*Primary Examiner*—David C. Nelms
*Assistant Examiner*—Thanh-Nhan P Nguyen
(74) *Attorney, Agent, or Firm*—Joseph P. Quinn; Seyfarth Shaw LLP

(57) ABSTRACT

Disclosed is a conductive polarizer for an LCD. The conductive polarizer includes a protective layer, an adhesive layer deposited on the protective layer, a lower support layer deposited on the adhesive layer, a polarizing layer deposited on the lower support layer, an upper support layer deposited on the polarizing layer, and an anti-glare/anti-static layer deposited on the upper support layer. The anti-glare/anti-static layer includes an antimony tin oxide layer formed at an upper surface thereof with a conductive polymer pattern for inducing static electricity and an anti-reflective layer formed on the antimony tin oxide layer including the conductive polymer pattern. Silica particles are distributed over a whole area of the anti-reflective layer.

4 Claims, 1 Drawing Sheet

CONDUCTIVE POLARIZER FOR LCD

BACKGROUND OF THE INVENTION

1. Field of the Invention

The present invention relates to a conductive polarizer for an LCD, and more particularly to a conductive polarizer for an LCD, capable of improving reliability of the LCD.

2. Description of the Prior Art

As generally known in the art, a thin film transistor liquid crystal display (TFT LCD) includes a lower substrate formed with a thin film transistor, which is a switching device, an upper substrate formed with color filter layers including red, green and blue color filter layers which are repeatedly aligned, a liquid crystal layer interposed between the upper and lower substrates, and polarizers attached to outer surfaces of the lower substrate and the upper substrate, respectively.

Herein, the polarizer is used for adjusting a polarizing state of light generated from a light source and includes a protective layer, an adhesive layer, a lower support layer, a polarizing layer, and an upper support layer, which are sequentially stacked from a bottom of the polarizer.

However, when attaching the polarizer to the upper and lower substrates during the fabricating process for the LCD, static electricity is generated so that the alignment of liquid crystal may become degraded. In addition, after the LCD has been fabricated, high-reflectance of light may occur at a surface of the upper substrate, thereby degrading the quality of an image.

In order to solve the above problem, a conductive polarizer capable of reducing reflectance of light at the surface of the upper substrate while preventing the misalignment of liquid crystal caused by the static electricity has been suggested.

The conductive polarizer is shown in FIG. 1. As shown in FIG. 1, the conductive polarizer includes a protective layer 11, an adhesive layer 12, a lower support layer 13, a polarizing layer 14 and an upper support layer 15, which are sequentially stacked from a bottom of the conductive polarizer. In addition, an anti-glare/anti-static layer 16 is deposited on the upper support layer 15.

Herein, the adhesive layer 12 is made from an acryl-based material. In addition, the lower support layer 13 and the upper support layer 15 are made from tri-acetate-cellulose (TAC), and the polarizing layer 14 is made from polyvinyl alcohol.

In the meantime, as shown in FIG. 2, the anti-glare/anti-static layer 16 includes an antimony tin oxide (ATO) layer 21 and an anti-reflective layer 22 deposited on the ATO layer 21. The anti-reflective layer 22 includes silica particles 23. In addition, metallic nickel particles 31 are distributed in the anti-reflective layer 22 including the metallic nickel particles 31 so as to prevent static electricity. The metallic nickel particles 31 may induce the static electricity charged in the upper surface of the polarizer in such a manner that the static electricity is evenly distributed over the whole area of the ATO layer 21, thereby evenly distributing the static electricity through the entire surface of the polarizer. Accordingly, degradation of image quality of the LCD caused by high static electricity can be prevented.

According to the above conventional conductive polarizer, the nickel particles must be evenly distributed over the whole area of the anti-reflective layer so as to induce the static electricity. However, it is difficult to evenly distribute the nickel particles over the whole area of the anti-reflective layer through the conventional process, so there is a limitation to reliably remove the static electricity. In addition, since the anti-reflective layer is made from a non-metallic organic polymer material although the nickel particles are made from a metallic material, adhesive force between the anti-reflective layer and the nickel particles becomes lowered, so reliability of the anti-glare/anti-static layer must be degraded.

SUMMARY OF THE INVENTION

Accordingly, the present invention has been made to solve the above-mentioned problems occurring in the prior art, and an object of the present invention is to provide a conductive polarizer for an LCD, capable of improving reliability of the LCD.

In order to accomplish the above object, according to the present invention, there is provided a conductive polarizer for an LCD, the conductive polarizer comprising: a protective layer; an adhesive layer deposited on the protective layer; a lower support layer deposited on the adhesive layer; a polarizing layer deposited on the lower support layer; an upper support layer deposited on the polarizing layer; and an anti-glare/anti-static layer deposited on the upper support layer, wherein the anti-glare/anti-static layer includes an antimony tin oxide layer formed at an upper surface thereof with a conductive polymer pattern for inducing static electricity and an anti-reflective layer formed on the antimony tin oxide layer including the conductive polymer pattern, and silica particles are distributed over a whole area of the anti-reflective layer.

According to the preferred embodiment of the present invention, the conductive polymer pattern includes one selected from the group consisting of polyacetylene, polypyrrole, and antimony tin oxide.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the present invention will be described with reference to accompanying drawings.

Although they are not illustrated, the conductive polarizer of the present invention includes a protective layer, an adhesive layer, a lower support layer, a polarizing layer, an upper support layer, and an anti-glare/anti-static layer, which are sequentially stacked from a bottom of the conductive polarizer.

However, the anti-glare/anti-static layer of the conductive polarizer according to the present invention is different from the conventional anti-glare/anti-static layer.

Figure 1:
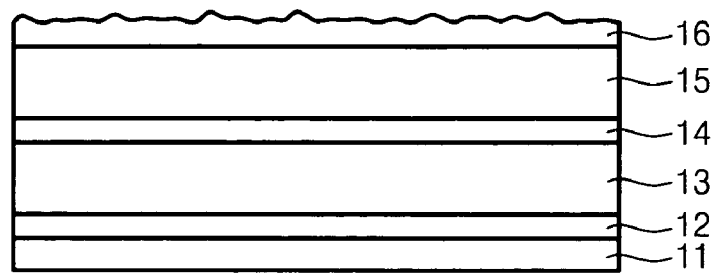
FIG. 1 is a sectional view illustrating a conventional conductive polarizer.
Figure 2:
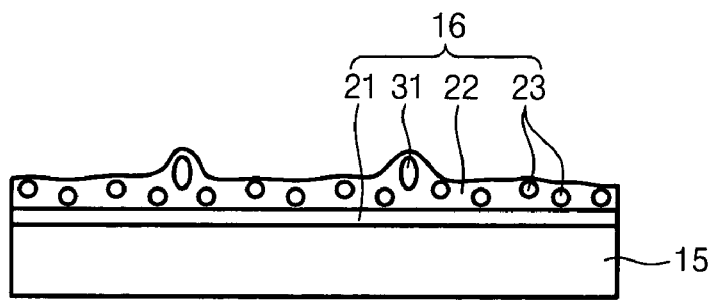
FIG. 2 is a sectional view for explaining an anti-glare/anti-static layer formed in a conventional conductive polarizer.
Figure 3:
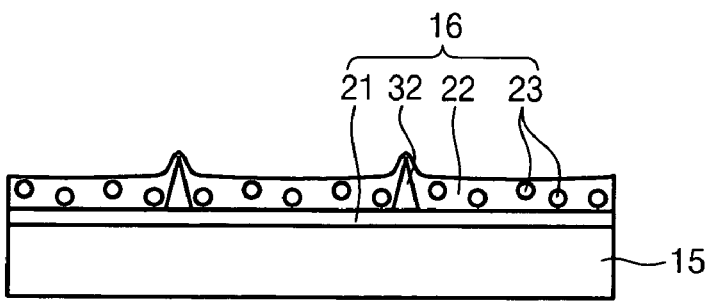
FIG. 3 is a sectional view for explaining an anti-glare/anti-static layer formed in a conductive polarizer according to one embodiment of the present invention.

FIG. 3 is a sectional view for explaining the anti-glare/anti-static layer formed in the conductive polarizer according to one embodiment of the present invention. As shown in FIG. 3, the anti-glare/anti-static layer 16 of the present invention includes an ATO layer 21 formed at an upper surface thereof with a conductive polymer pattern 32, such as polyacetylene or polypyrrole. An anti-reflective layer 22 is deposited on the ATO layer 21 including the conductive polymer pattern 32. In addition, silica particles 23 distributed in the anti-reflective layer 22.

Herein, the conductive polymer pattern 32 according to the present invention is formed through photolithographic and etching processes. Therefore, according to the present invention, the conductive polymer pattern 32 can be uniformly distributed over the whole area of the ATO layer 21, so the static electricity charged in the polarizer can be evenly distributed over the whole area of the ATO layer 21. Thus, the static electricity generated when attaching the polarizer can be reliably removed through the polarizer.

In addition, according to the present invention, the anti-glare/anti-static layer 16 employs the conductive polymer material, instead of the metallic nickel particles, so as to prevent the static electricity. Since the polymer material has a property similar to that of the anti-reflective layer 22, the conductive polymer pattern 32 can be securely bonded to the anti-reflective layer 22 with higher bonding force, so it is possible to ensure reliability of the anti-glare/anti-static layer 16.

In the meantime, the conductive polymer pattern 32 for preventing the static electricity can be made from ATO instead of polyacetylene or polypyrrole. In addition, the conductive polymer pattern 32 can be formed with various shapes, such as a triangular pyramid shape, a quadrangular pyramid shape, a conical shape or a cylindrical shape.

As described above, the present invention employs the conductive polymer pattern in order to prevent the static electricity, so the anti-reflective layer can be bonded to the conductive polymer pattern with higher bonding force, thereby improving reliability of the anti-glare/anti-static layer.

In addition, since the conductive polymer pattern is formed through the photolithographic and etching processes, the conductive polymer pattern can be evenly distributed so that the static electricity can be efficiently prevented.

Furthermore, the present invention uses the inexpensive conductive polymer pattern, instead of expensive nickel particles, the manufacturing cost for the polarizer can be reduced.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A conductive polarizer for a liquid crystal display, the conductive polarizer comprising:
   a protective layer;
   an adhesive layer deposited on the protective layer;
   a lower support layer deposited on the adhesive layer;
   a polarizing layer deposited on the lower support layer;
   an upper support layer deposited on the polarizing layer; and
   an anti-glare/anti-static layer deposited on the upper support layer, the anti-glare/anti-static layer including an antimony tin oxide layer formed at an upper surface thereof with a conductive polymer pattern for inducing static electricity and an anti-reflective layer formed on the antimony tin oxide layer including the conductive polymer pattern, silica particles being distributed over a whole area of the anti-reflective layer.

2. The conductive polarizer as claimed in claim 1, wherein the conductive polymer pattern includes one selected from the group consisting of polyacetylene and polypyrrole.

3. The conductive polarizer as claimed in claim 1, wherein the conductive polymer pattern is formed with a triangular pyramid shape, a quadrangular pyramid shape, a conical shape, or cylindrical shape.

4. A conductive polarizer for a liquid crystal display, the conductive polarizer comprising:
   a protective layer;
   an adhesive layer deposited on the protective layer;
   a lower support layer deposited on the adhesive layer;
   a polarizing layer deposited on the lower support layer;
   an upper support layer deposited on the polarizing layer; and
   an anti-glare/anti-static layer deposited on the upper support layer, the anti-glare/anti-static layer including an antimony tin oxide layer formed at an upper surface thereof with an antimony tin oxide pattern for inducing static electricity and an anti-reflective layer formed on the antimony tin oxide layer including the antimony tin oxide pattern, silica particles being distributed over a whole area of the anti-reflective layer, wherein the antimony tin oxide pattern is formed with a triangular pyramid shape, a quadrangular pyramid shape, a conical shape, or a cylindrical shape.

* * * * *